(12) United States Patent
Karbasivalashani et al.

(10) Patent No.: US 9,612,395 B2
(45) Date of Patent: Apr. 4, 2017

(54) OPTICAL FIBER WITH A VARIABLE REFRACTIVE INDEX PROFILE

(75) Inventors: Salman Karbasivalashani, Milwaukee, WI (US); Karl William Koch, III, Elmira, NY (US); Arash Mafi, Milwaukee, WI (US)

(73) Assignees: Corning Incorporated, Corning, NY (US); UWM Reserach Foundation, Inc., Milwaukee, WI (US)

( * ) Notice: Subject to any disclaimer, the term of this patent is extended or adjusted under 35 U.S.C. 154(b) by 224 days.

(21) Appl. No.: 13/358,743

(22) Filed: Jan. 26, 2012

(65) Prior Publication Data
US 2013/0195410 A1    Aug. 1, 2013

(51) Int. Cl.
*G02B 6/02* (2006.01)

(52) U.S. Cl.
CPC ........ *G02B 6/02338* (2013.01); *G02B 6/0229* (2013.01)

(58) Field of Classification Search
USPC .......................................................... 385/125
See application file for complete search history.

(56) References Cited

U.S. PATENT DOCUMENTS

| | | | |
|---|---|---|---|
| 3,870,399 A * | 3/1975 | Randall | G02B 6/06 385/116 |
| 4,165,222 A * | 8/1979 | de Panafieu | C03B 37/016 65/30.1 |
| 4,252,408 A * | 2/1981 | Parsons | C30B 21/02 313/475 |
| 5,155,792 A * | 10/1992 | Vali et al. | 385/125 |
| 5,375,012 A | 12/1994 | Borrelli et al. | |
| 6,243,522 B1 | 6/2001 | Allan et al. | |
| 7,072,552 B2 | 7/2006 | Manyam et al. | |
| 7,450,806 B2 | 11/2008 | Bookbinder et al. | |
| 7,930,904 B2 | 4/2011 | Bookbinder et al. | |
| 2004/0240832 A1* | 12/2004 | Hoke | G02F 1/0115 385/143 |
| 2005/0094954 A1* | 5/2005 | Pickrell | C03B 37/01297 385/123 |
| 2005/0232561 A1* | 10/2005 | Murofushi | G02B 6/02033 385/125 |
| 2006/0120678 A1 | 6/2006 | Manyam et al. | |
| 2006/0147170 A1* | 7/2006 | Ashkenasi et al. | 385/132 |
| 2007/0104437 A1 | 5/2007 | Bookbinder et al. | |
| 2008/0056654 A1 | 3/2008 | Bickham et al. | |
| 2008/0056658 A1 | 3/2008 | Bickham et al. | |
| 2008/0131066 A1 | 6/2008 | Bickham et al. | |

(Continued)

OTHER PUBLICATIONS

Wiersma, "Localization of light in a disordered medium", Dec. 1997, Nature, vol. 390, pp. 671-673.*

(Continued)

*Primary Examiner* — Mike Stahl
(74) *Attorney, Agent, or Firm* — Robert L. Carlson

(57) ABSTRACT

An optical waveguide, such as an optical fiber, which relies on a mechanism involving scattering in random structures to confine light to a region of the waveguide and allow propagation of electromagnetic radiation along the length of the waveguide includes an optically transmissive body having a length and a cross-section transverse to the length, wherein the optically transmissive body has refractive indices that are cross-sectionally random and substantially invariant along the length direction of the waveguide.

20 Claims, 2 Drawing Sheets

(56) References Cited

U.S. PATENT DOCUMENTS

| | | | |
|---|---|---|---|
| 2010/0176200 A1* | 7/2010 | Vollmer et al. | 235/462.01 |
| 2013/0163942 A1* | 6/2013 | Wiersma et al. | 385/130 |
| 2016/0070059 A1* | 3/2016 | Chen | C03B 37/15 |
| | | | 385/125 |

OTHER PUBLICATIONS

T. Monro et al., "Holey fibers with random cladding distributions," Optics Letters 25, 206 (2000).

T. Schwartz, et al., "Transport and Anderson localization in disordered two-dimensional photonic lattices," Nature 448, 52-55 (2007).

Reichenbach et al., "Numerical analysis of light propagation in image fibers or coherent fiber bundles," Jan. 29, 2007, 15 pages.

Karbasi et al., "Fabrication and Characterization of Two-Dimensional Anderson Localized Polymer Optical Fibers," 2013, 9 pages.

Karbasi et al., "Transverse Anderson localization in a disordered glass optical fiber," Oct. 2, 2012, 8 pages.

Thomas P. Seward, III, "Elongation and Spheroidization of Phase-Separated Particles in Glass," Feb. 14, 1974, 18 pages.

Wang et al., "Mean Squared Error: Love It or Leave it? A new look at signal fidelity measures," Jan. 2009, 20 pages.

Wang et al., "Image Quality Assessment: From Error Visibility to Structural Similarity," Apr. 2004, 13 pages.

Demuynck et al., "Incoherent optical fiber bundle calibration for image transmission: faster, finer, and higher-resolution image reconstruction," Mar. 1, 2011, 23 pages.

Fujikura, "Standard Specifications for Imagefibers," Publication date unknown, downloaded Aug. 13, 2014, 11 pages.

Schott, "Leached Image Bundles," Oct. 2011, 2 pages.

Fujikura Ltd., "Imagefiber Products," Jul. 2008, 18 pages.

Schott, "Leached Image Bundles," Publication date unknown, at least as early as Apr. 11, 2010, 2 pages.

Hopkins et al., "A Flexible Fibrescope, using Static Scanning," Jan. 2, 1954, 3 pages.

Sheng, "Introduction to Wave Scattering, Localization, and Mesoscopic Phenomena," 1995, 353 pages.

Seward III, T. P., "The Physics of Non-Crystalline Solids," 1977, 5 pages.

Karbasi et al., "Image transport through a disordered optical fiber mediated by transverse Anderson localization," publication, Feb. 25, 2014. 9 pages.

Anderson, P.W., "Absence of diffusion in certain random lattices," Mar. 1, 1958, 14 pages.

Sajeev John, "Strong Localization of Photons in Certain Disordered Dielectric Superlattices," Jun. 8, 1987, 4 pages.

Juliette Billy et al., "Direct observation of Anderson localization of matter waves in a controlled disorder," Jun. 12, 2008, 5 pages.

S. S. Abdullaev, F. et al., "On propagation of light in fiber bundles with random parameters," Mar. 2, 1979, 4 pages.

Hans De Raedt et al., "Transverse Localization of Light," Jan. 2, 1989, 4 pages.

Karabasi et al., "Observation of transverse Anderson localization in an optical fiber," Jun. 15, 2012, 3 pages.

Karabasi et al., "Multiple-beam propagation in an Anderson localized optical fiber," Jan. 4, 2013, 9 pages.

Karabasi et al., "Detailed investigation of the impact of the fiber design parameters on the transverse Anderson localization of light in disordered optical fibers," Jul. 31, 2012, 15 pages.

Tal Schwartz et al., "Transport and Anderson localization in disordered two-dimensional photonic lattices," Mar. 1, 2007, 5 pages.

Hopkins et al., "A flexible Fiberscope using static scanning," Jan. 1, 1954, 1 page.

Jae-Ho Han et al., "Pixelation effect removal from fiber bundle probe based optical coherence tomography imaging," Mar. 25, 2010, 13 pages.

Xianpei Chen et al., "Experimental and theoretical analysis of core-to-core coupling on fiber bundle imaging," Dec. 15, 2008, 10 pages.

Kristen Lantz Reichenbach et al., "Numberical analysis of light propagation in image fibers or coherent fiber bundles," Mar. 5, 2007, 15 pages.

Thomas Pertsch et al., "Nonlinearity and Disorder in Fiber Arrays," Jul. 30, 2004, 4 pages.

Karbasi et al., "A modal perspective on the transverse Anderson localization of light in disordered optical lattices," Jan. 10, 2013, 9 pages.

Yoav Lahini, "Anderson Localization and Nonlinearity in One-Dimensional Disordered Photonic Lattices," Jan. 11, 2008, 4 pages.

M. V. Berry et al., Transparent mirrors: rays, waves and localization, 1997, 7 pages.

Youngwoon Choi et al., "Scanner-Free and Wide-Field Endoscopic Imaging by Using a Single Multimode Optical Fiber," Nov. 16, 2012, 5 pages.

Anderson, "The question of classical localization: a theory of white paint?" Phil. Mag. B, 52, 505-509 (1985).

John, "Electromagnetic absorption in a disordered medium near a photon mobility edge," Phys. Rev. Lett. 53, 2169-2172 (1984).

* cited by examiner

OPTICAL FIBER WITH A VARIABLE REFRACTIVE INDEX PROFILE

This invention was made with government support under Grant Number ECCS-1029547 awarded by The National Science Foundation. The government has certain rights in the invention.

FIELD

The disclosed embodiments pertain to the field of optical waveguides.

BACKGROUND

Optical waveguides are used in a number of application areas, including telecommunications, sensing, illumination, endoscopy and imaging. Optical fibers are a class of waveguides, which are typically cylindrical in geometry and can be manufactured in lengths that are long compared to their diameter. Optical fibers can employ a variety of mechanisms to confine the light in the structure and conduct it along the fiber length. There are examples of fibers using total internal reflection (TIR) between a high-index core and a lower-index cladding, as well as fibers using photonic band gaps (PBG), which are structures that prohibit the propagation of light at certain frequencies to confine light to regions that do not prohibit propagation.

SUMMARY

The disclosed embodiments employ another mechanism that involves scattering in cross-sectionally disordered structures to confine light to a region of a waveguide and enable it to propagate along the length of the waveguide.

In certain embodiments, the optical waveguide includes an optically transmissive body having a length and a cross-section transverse to the length, wherein the optically transmissive body has refractive indices that are cross-sectionally disordered. This structure facilitates confinement of light launched into the waveguide in a direction transverse to the length of the waveguide and propagation along the length direction of the waveguide.

In certain embodiments, at least two optically transmissive materials having different refractive indices are randomly distributed with respect to the cross-section transverse to the length direction of the optical waveguide.

In certain embodiments, the optical waveguide includes a glass body having voids that extend along the length direction of the waveguide and are randomly distributed over the cross-section of the optically transmissive body.

In certain embodiments, the optical waveguide includes a glass body having voids that extend along the length direction of the waveguide, but not necessarily along the entire length of the waveguide, and are randomly distributed with respect to the cross-section of the optically transmissive body, and in which the voids contain a gaseous material. In certain specific embodiments, the gaseous material is air.

In other embodiments of the invention, the optically transmissive body has a substantially circular or oval cross-sectional shape.

The optical waveguide can be an optical fiber.

In certain embodiments, the optically transmissive body has a maximum dimension along the cross-section that is from about 10 micrometers to about 1,000 micrometers, such as about 100 to 150 micrometers.

In order to provide strength and support for the optically transmissive body, it can be provided with a surrounding glass coating, and/or one or more surrounding polymer coatings.

In certain embodiments, the optical waveguide is comprised of at least two optically transmissive materials, with at least one of the materials being distributed cross-sectionally in discrete regions, with each region having a maximum cross-sectional dimension (the longest straight line from one point on the periphery of the discrete region to another point on the periphery of the discrete region which is within the same cross-sectional plane) that is about 0.1 to 10 times the wavelength of the propagated electromagnetic waves, more preferably 0.1 to 5 times the wavelength, such as for example from 0.1 to 2 times the wavelength of the propagated electromagnetic waves. For typical wavelengths used in fiber optics (e.g., 850, 1300 and 1550 nm), this corresponds to a dimension of about 85 nm to 15,500 nm (15.5 micrometers), such as 85 nm to 3,100 nm (3.1 micrometers).

In accordance with certain embodiments, the optical waveguide comprises a glass body having voids that extend along the length direction of the waveguide and are distributed in a disordered manner with respect to the cross-section of the optically transmissive body, with the voids containing air, and the air occupying from about 5% to about 90% of the total volume of the optically transmissive body, such as from about 20% to about 80%, 30% to 70%, 40% to 60%, or about 50%.

In accordance with certain embodiments, an optical waveguide has a length and a cross-sectional area transverse to the length, and includes at least two different materials through which electromagnetic waves can be propagated, with the two different materials having different refractive indices and being separated into regions distributed in a disordered manner throughout the cross-sectional area of the optical waveguide. The cross-sectional dimensions and cross-sectional distribution of at least one of the two materials in the other of two materials is selected to facilitate strong localization of an electromagnetic wave transverse to the length direction of the optical waveguide. Such variation in refractive index along the length direction of the optical waveguide can be tolerated. However, there is sufficient longitudinal order to facilitate propagation of an electromagnetic wave along the length direction of the waveguide, whereby the optical waveguide is devoid of core and cladding regions. In other words, the waveguide is structured to achieve propagation along the length direction of the waveguide.

While not being bound by any particular theory, it is believed that the waveguides disclosed herein may utilize Anderson localization or strong localization, and do not rely on total internal reflection from a core-cladding interface.

In accordance with certain embodiments, the cross-sectional dimension (e.g., diameter) of the at least one material distributed through the cross-sectional area of the optical waveguide is less than one hundred square wavelengths (for example for a 1550 propogation wavelength, would be 1550×1550×100=240 microns$^2$ of the electromagnetic radiation that is intended to be propagated along the optical waveguide, such as less than half the square wavelength of the electromagnetic radiation that is intended to be propagated.

In certain embodiments, the distribution of the at least one material is homogeneously random through the cross-sectional area, such that different cross-sectional sub-regions have substantially similar wave propagation characteristics.

The foregoing general description and the following detailed description represent specific embodiments, and are intended to provide an overview or framework for understanding the nature and character of the claims.

DETAILED DESCRIPTION

Figure 1:
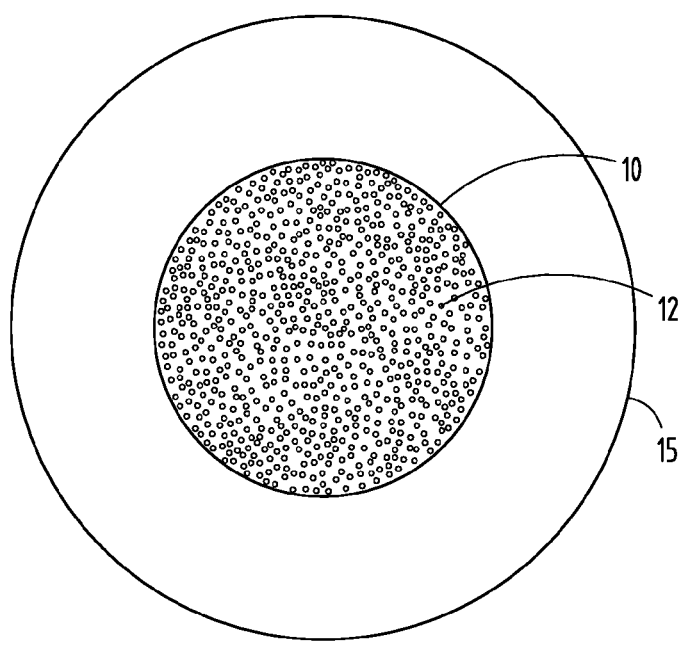
FIG. 1 is a cross-sectional view of an optically transmissive body having refractive indices that are cross-sectionally distributed in a disordered manner.

The various optical waveguide embodiments disclosed herein rely on a mechanism involving scattering in cross-sectionally disordered structures to confine light to a region of the waveguide and enable propagation along the length of the waveguide.

The confinement of waves in random structures was disclosed by Anderson, "Absence of diffusion in certain random lattices," Phys. Rev. 109, 1492-1505 (1958). It is suggested that localization of electrons in disordered materials may occur due to a quantum mechanical interference of randomly scattered electrons. While not being bound to any particular theory, the various embodiments disclosed herein may employ mechanisms analogous to those involving localization of electrons in disordered materials. The properties of such a waveguide have characteristics different from conventional waveguides, such as TIR waveguides and PBG waveguides. More specifically, material is distributed with a sufficient degree of cross-sectional disorder to achieve propagation along the length direction of the waveguide.

A characteristic of the distributed phase is that there are not any regions having a cross sectional dimension greater than about 20 micrometers that have an average refractive index that is substantially different from another region of at least similar dimensions. In particular, there is no discernible core and there are no discernible cladding regions. Further, propagation does not occur via total internal reflection at a core-cladding interface.

A characteristic of the randomness of the distributed phase is that there are not any discernible regions having a cross sectional dimension greater than about 20 micrometers that have an average refractive index that is substantially different from another region of at least similar dimensions. In particular, there is no discernible core or cladding regions, and no wave propagation via total internal reflection at a core-cladding interface.

The optical waveguides disclosed herein have a cross-sectionally random refractive index that confines light in a direction transverse to the axial or length direction of the waveguide, facilitating light propagation along the length of the fiber without the need for a cladding. The refractive index contrast and scale of the random structure are chosen to achieve a desired area of confinement of a propagating electromagnetic wave (e.g., visible or ultraviolet light). Simulations indicate that the refractive index contrast can be as large as that between air and glass, and in principle even larger, and as small as that between silica and germanium-doped silica, such as is typical of conventional fibers. The scale of the structure depends on the transverse wave vector of the propagating field.

For localization to be achieved, the product of the scattering length (scattering mean free path) and transverse wave vector should be on the order of unity.

A disordered cross-sectional distribution of refractive indices refers to the absence of an easily identifiable pattern in which different refractive indices are distributed cross-sectionally, and/or a cross-sectional distribution which achieves the desired ability to propagate electromagnetic radiation along the length of the waveguide without a core or cladding region.

While the refractive indices vary cross-sectionally, each cross-section of the optical waveguides can be substantially invariant, meaning that discrete volume regions having a characteristic refractive index can extend axially along the entire length of the waveguide parallel to the axis of the waveguide without substantial variance in the cross-sectional shape or area of the discrete volume region, with any variance being relatively minor and not materially affecting the performance characteristics of the waveguide.

Alternatively, depending on the manufacturing process used, cross sections taken at different points along the length of the waveguide can have different patterns, with a distributed phase extending longitudinally for less than the entire length of the waveguide, such as several meters, or even less than a meter.

The aspect ratio of the distributed phase (i.e., the ratio of the length to diameter) is typically very high, such as greater than $10^4$:1, greater than $10^6$:1, greater than $10^8$:1, or greater than $10^{10}$:1.

An advantage of the disclosed embodiments is that light launched into the waveguide need not be precisely aligned, as is the case for conventional waveguides relying on total internal reflection or photonic band gaps. This reduction in alignment tolerance could have the benefits of achieving lower cost waveguides and lower tolerance connection applications.

Light launched at different positions across the fiber cross-section, when sufficiently separated, can propagate independently, leading to a spatially multiplexed, multi-channel configuration. Although there is no defined core, the propagating energy can be confined to an area comparable to conventional, single-mode optical fibers. Thus, it is possible to consider a number of independent, spatially separate transmission channels in a reasonable waveguide cross-section.

FIG. 1 shows an example of a fiber cross-section consisting of a glass body 10 with air holes 12 randomly distributed throughout the cross-sectional area of the glass body. Optionally, the waveguide can be provided with a solid glass outer cylinder 15 that provides support and strength for the waveguide. Also, optionally, the waveguide (e.g., fiber) may be provided with one or more organic (e.g., polymeric) coatings to protect the waveguide against cracks and/or damage during handling.

Figure 2:
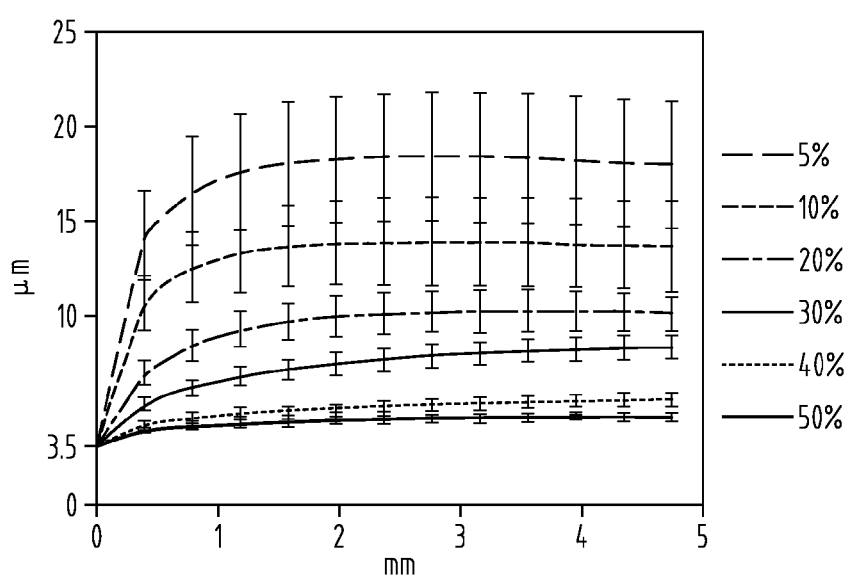
FIGS. 2, 3 and 4 are graphical representations of beam radius evolution with propagation distance for a series of optical waveguides having an optically transmissive body comprised of a glass matrix material having randomly distributed voids containing air.

Beam radius evolution with propagation distance for a series of air-filling percentages is shown in FIG. 2. In each case, air-containing voids are distributed randomly throughout the cross-section of a glass body, with the total volume of the air-containing voids relative to the volume of the optical transmissive body (glass plus voids) ranging from 5% to 50%. The beam radius is determined by averaging the optical field distribution over the fiber cross-section. A 7 micrometer diameter Gaussian beam is launched at the entrance of the fiber and the evolution of the field is measured along the length of the fiber. The error bars are calculated from multiple random fiber cross-section realizations. The larger air-filling percentages achieve narrower beam profiles. The diameter of the air holes in the fiber cross-section is approximately half of the wavelength of the propagated light.

Figure 3:
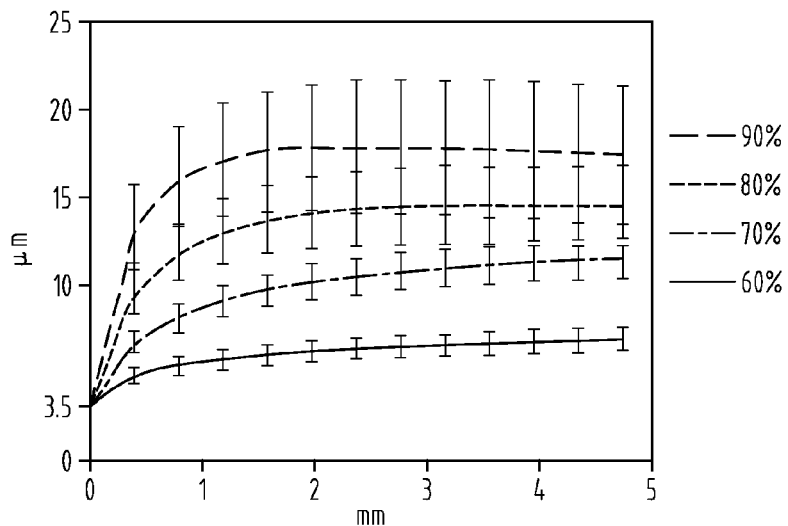

In FIG. 3, beam radius evolution with propagation distance is illustrated for a series of air-filling percentages ranging upwardly from 60% to 90%. The beam radius was determined by averaging the optical field distribution over the fiber cross-section. A 7 micrometer diameter Gaussian beam was launched at the entrance of the fiber and the evolution of the field was measured along the length of the fiber. The error bars were calculated from multiple random fiber cross-section realizations. The air-filling percentages larger than 50% result in larger beam diameters. The diameter of the air holes in the fiber cross-section was about half of the wavelength of the propagated light. In each of these examples illustrated in FIG. 3, the optically transmissive body comprises more air than glass on a volume basis. The results indicate that 50% air-filling percentage achieved the smallest beam radius on propagation.

Figure 4:
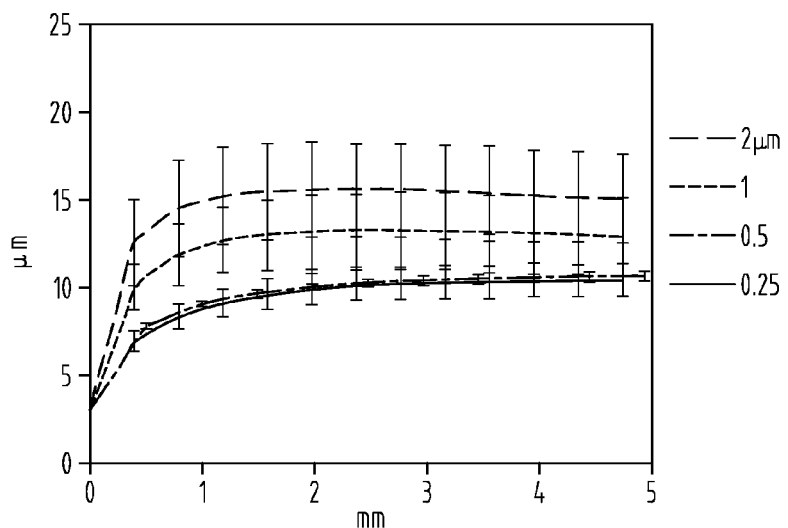

Beam radius evolution as a function of propagation distance for a series of fibers having different air-hole sizes is illustrated in FIG. 4. In each case, the air-filling percentage is 20%. FIG. 4 indicates that larger air-hole sizes result in larger beam radii on average, with a larger variation when compared with smaller air holes.

Figure 5:
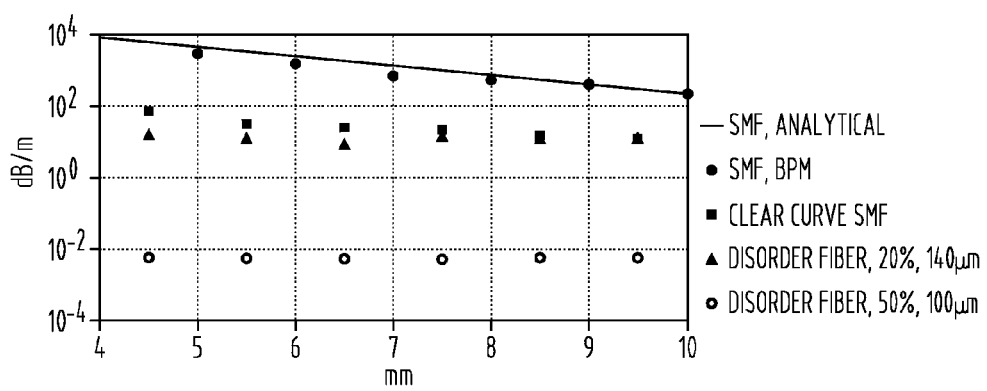
FIG. 5 is a graph illustrating bend loss as a function of bend radius for various embodiments having air-containing voids distributed cross-sectionally.

Bend loss as a function of bend radius is illustrated for a series of fiber types in FIG. 5. The 50% air-filling fraction random profile fiber shows significantly less bend loss than commercially available fibers such as ClearCurve® optical fiber, SMF-ULTRA® optical fiber, SMF-28E+® optical fiber, SMF-28E® optical fiber, and SMF-28® optical fiber.

The waveguides described herein may be fabricated using a so-called "stack-and-draw" approach with random positioning of solid rods and hollow capillaries, such as in a 50:50 volume ratio. The randomly positioned solid rods and hollow capillaries can be heated, fused and drawn into the fibers (or other waveguide forms) using a conventional tower setup. Suitable processes that are readily adaptable for making the waveguides disclosed herein are well known in the art, such as from U.S. Pat. No. 6,243,522 to Allan et al. (assigned to Corning Incorporated, Corning, N.Y.).

The waveguides disclosed herein can be made by using perform consolidation conditions that are effective to trap a significant amount of a gaseous material in a consolidated glass blank, causing voids in the consolidated glass waveguide perform. In particular, by utilizing relatively low permeability gases and/or relatively high sintering rates, holes can be trapped in the consolidated glass during the consolidation process. The sintering rate can be increased by increasing the sintering temperature and/or increasing the downfeed rate of the soot perform through the sintering zone of the consolidation furnace. Under certain sintering conditions, it is possible to obtain glasses in which the area fraction of the trapped gases is a significant fraction of the total area or volume of the preform. Techniques that can be modified for making fibers as disclosed herein are described in U.S. Pat. Nos. 7,450,806 and 7,930,904.

By utilizing the consolidation parameters so that the maximum diameter of the holes or voids (i.e., the largest cross-sectional dimension of the holes or other distributed phase) is less than the wavelength of the light which is to be transmitted along the length of the waveguide (e.g., in the case of optical fibers for use in telecommunications applications, less than 1550 nm), the waveguide may be effectively used to transmit information at a particular wavelength. Examples of suitable diameters for the holes or disordered phase are such that the resulting transverse scattering mean free path is comparable to the inverse of the transverse wavevector. The transverse wavevector is defined as $$\kappa_T = \sqrt{\left(\frac{2\pi n}{\lambda}\right)^2 - \beta^2}$$

where n is the effective refractive index of the material, $\lambda$ is the wavelength, and $\beta$ is the longitudinal component of the wave-vector. Structures with effective refractive indices close to those of the material result in small transverse wavevectors and thus longer effective wavelengths in the transverse direction. The effective transverse wavelength, is defined as $$\lambda_T = \frac{2\pi}{K_T} = \frac{2\pi}{\sqrt{(2\pi n/\lambda)^2 - \beta^2}}$$

where n is the bulk effective refractive index of the medium, $\lambda$ is the wavelength of the propagating light, and $\beta$ is the effective longitudinal component of the wave-vector. In certain embodiments, the distributed material can have a diameter from 0.1 to 10.0, more preferably from 0.1 to 5.0 times the wavelength of the light being propagated.

As another alternative, waveguides having regions of different refractive indices distributed over the cross-section of the waveguide can be prepared by modifying known processes employing phase-separated glasses. Such techniques that are adaptable for making the waveguides disclosed herein are, for example, described in U.S. Pat. No. 3,870,399 to Randall et al. (expired) and U.S. Pat. No. 5,375,012 to Borrelli et al. (expired). This technique involves using a glass which, upon heating, separates into at least two phases, one phase being in the form of particles dispersed in a matrix or continuous second phase, the different phases having different refractive indices. Waveguides as described herein, can be obtained during a conventional drawing process of such phase-separated glasses, so that second phase droplets are stretched or elongated into low-index microstructures or high-index microstructures that extend along the length of the resulting waveguide.

The foregoing description provides exemplary embodiments to facilitate an understanding of the nature and character of the claims. It will be apparent to those skilled in the art the various modifications to these embodiments can be made without departing from the spirit and scope of the appending claims.

What is claimed is:

1. An optical waveguide comprising:
   an optically transmissive body having a length and a cross-section transverse to the length, the optically transmissive body including a distributed phase having refractive indices that are distributed in a substantially random disordered manner over the entire cross-section, whereby light launched into the waveguide is confined in a direction transverse to the length of the waveguide due to the distributed refractive indices, such that the light is propagated along the length direction of the waveguide;

wherein there are not any discernable regions having a cross sectional dimension greater than 20 micrometers that have an average refractive index that is substantially different from another region having a cross sectional dimension of at least 20 micrometers, and wherein there is no discernible core or cladding regions, and propagation does not occur via total internal reflection at a core-cladding interface, and wherein the optically transmissive body is surrounded by at least one glass or polymer coating layer or both that provides strength and support for the optically transmissive body.

2. An optical waveguide according to claim 1, comprised of at least two optically transmissive Materials that are distributed with respect to the cross-section transverse to the length direction of the optical waveguide, the two materials having different refractive indices.

3. An optical waveguide according to claim 1, wherein the optically transmissive body is comprised of glass having voids that extend along the length direction of the waveguide and are randomly distributed with respect to the cross-section of the optically transmissive body.

4. An optical waveguide according to claim 3, in which the voids contain a gaseous material.

5. An optical waveguide according to claim 4, in which the gaseous material is air.

6. An optical waveguide according to claim 1, in which the optically transmissive body has a substantially circular or oval cross-sectional shape.

7. An optical waveguide according to claim 1, in which the optical transmissive body has a maximum dimension along the cross-section no more than about 1,000 micrometers.

8. An optical waveguide according to claim 1, in which the optically transmissive body is comprised of at least two different optically transmissive materials, at least one of the materials being distributed cross-sectionally in discrete regions, each discrete region having a maximum cross-sectional dimension that is about 15 micrometers or less.

9. An optical waveguide according to claim 1, in which the optically transmissive body is comprised of at least two different optically transmissive materials, at least one of the materials being distributed cross-sectionally in discrete regions, each discrete region having a maximum cross-sectional dimension that is from about 85 nm to 15 micrometers.

10. An optical waveguide according to claim 5, in which the voids containing air comprise from about 5% to 90% of the volume of the optically transmissive body.

11. An optical waveguide according to claim 5, in which the voids containing air comprise from about 20% to 80% of the volume of the optically transmissive body.

12. An optical waveguide according to claim 5, in which the voids containing air comprise from about 30% to 70% of the volume of the optically transmissive body.

13. An optical waveguide according to claim 5, in which the voids containing air comprise from about 40% to 60% of the volume of the optically transmissive body.

14. An optical waveguide according to claim 5, in which the voids containing air comprise about 50% of the volume of the optically transmissive body.

15. An optical waveguide according to claim 1, which is a fiber having an optically transmissive body having a circular or oval cross-sectional shape and a maximum cross-sectional dimension of no more than about 1,000 micrometers, and in which the optically transmissive body is comprised of two optically transmissive materials, at least one of the materials being distributed cross-sectionally in discrete regions within the other material, each discrete region having a maximum cross-sectional dimension of from about 85 nm to 15 micrometers.

16. An optical waveguide according to claim 2, in which a distributed material defines a length and a diameter, and in which a ratio of the length to the diameter is greater than $10^4:1$.

17. An optical waveguide according to claim 2, in which a distributed material has a diameter from 0.1 to 10 times the wavelength of light being propagated.

18. An optical waveguide according to claim 1, into which light launched at different positions across the fiber cross-section can propagate independently, providing a spatially multiplexed, multi-channel configuration.

19. An optical waveguide comprising:
an optically transmissive body having a length and a cross-section transverse to the length, the optically transmissive body including a distributed phase having refractive indices that are distributed in a substantially random disordered manner over the entire cross-section, whereby light launched into the waveguide is confined in a direction transverse to the length of the waveguide due to the distributed refractive indices, such that the light is propagated along the length direction of the waveguide; wherein there are not any discernable regions having a cross sectional dimension greater than 20 micrometers that have an average refractive index that is substantially different from another region having a cross sectional dimension of at least 20 micrometers, and wherein there is no discernible core or cladding regions, and propagation does not occur via total internal reflection at a core-cladding interface, and wherein the optically transmissive body is comprised of glass having voids that extend along the length direction of the waveguide and are randomly distributed with respect to the cross-section of the optically transmissive body.

20. An optical waveguide according to claim 19, in which the cross-sectional dimensions of the at least one material distributed through the cross-sectional area of the optical waveguide is less than the wavelength of the electromagnetic radiation, that is intended to be propagated along the optical waveguide.

* * * * *